Dec. 12, 1950  R. JONGEDYK  2,533,942
EXTRUDING APPARATUS
Filed May 6, 1948
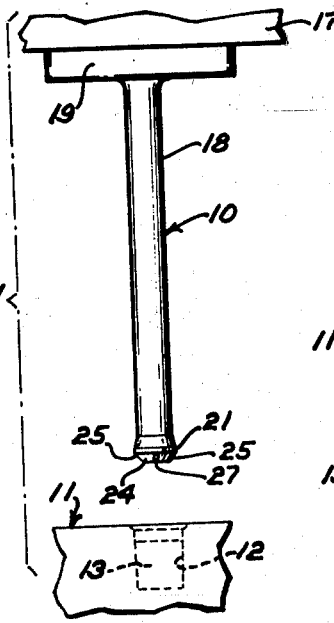
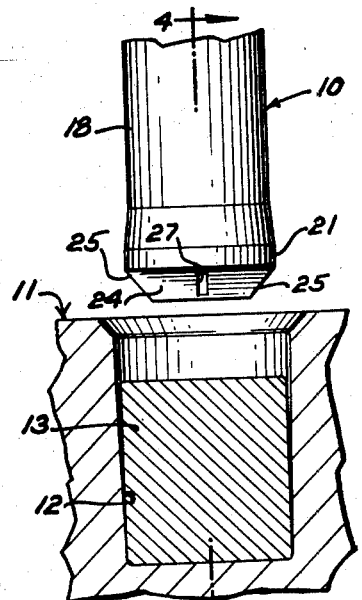
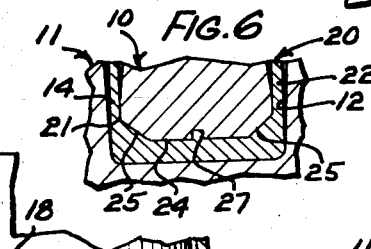
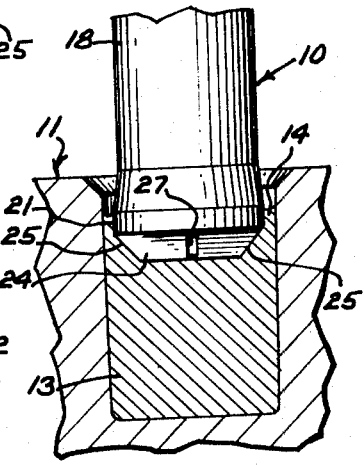
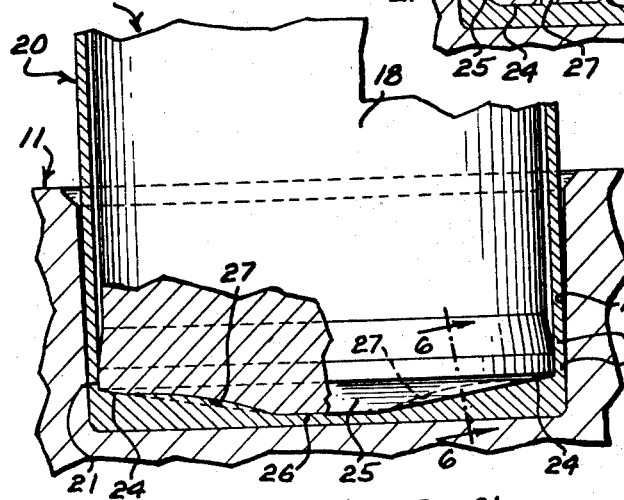
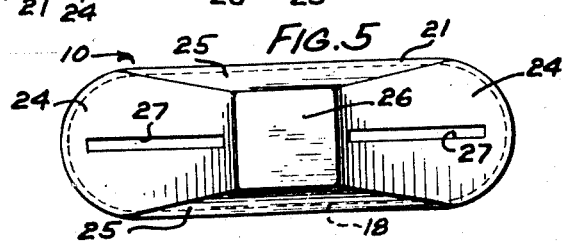
INVENTOR
R. JONGEDYK
BY E. F. Kane
ATTORNEY Patented Dec. 12, 1950

2,533,942

UNITED STATES PATENT OFFICE 2,533,942

EXTRUDING APPARATUS

Ralph Jongedyk, Hinsdale, Ill., assignor to Western Electric Company, Incorporated, New York, N. Y., a corporation of New York Application May 6, 1948, Serial No. 25,371

2 Claims. (Cl. 207—2)

This invention relates to extruding apparatus and more particularly to a punch and die set for extruding non-circular hollow articles, such as seamless containers by a so-called backward extrusion process.

In the manufacture of non-circular seamless containers by this process, a portion of a metal slug is squeezed or extruded through a space between a vertically reciprocable punch and a cooperating die cavity surface and is caused to flow upwardly along the shank of the punch to form the wall of the container, while the portion of the metal slug remaining between the bottom end surface of the punch and the bottom surface of the die cavity forms the bottom wall of the container. This extrusion process of manufacturing non-circular seamless containers is employed quite extensively in the manufacture of seamless metal containers or tubes, such as tooth paste tubes and the like.

When flat sided containers of greater length than width in cross section are extruded, some difficulties have been encountered heretofore in causing an adequate flow of the extruded metal towards the opposite narrow walls as well as towards the opposite longer side walls to produce a desired wall thickness throughout the container. These difficulties apparently have been due to the tendency of the extruding punch to deflect laterally or bend when subjected to the high pressures required for the extrusion process, particularly when extruding the relatively harder metals, such as aluminum or aluminum alloys, since the extruding punch is necessarily long and of relatively small cross sectional area. This objectionable bending or deflection of the punch usually occurs at the beginning of the extruding operation and is due, in some instances, to irregularities in the metal slugs.

An object of the present invention is to avoid the difficulties referred to above. Another object is to provide means to anchor and guide the punch, thus tending to prevent lateral deflection or bending thereof.

In accordance with the above objects, one embodiment of the invention is designed for extruding hollow seamless containers of greater length than width in cross-section, and which are long and of relatively narrow cross-section, from an aluminum alloy slug. In this embodiment, a punch of non-circular cross-section, which is long and of relatively small cross-sectional area, cooperates with a suitably shaped die cavity. The punch is provided, at its lower end working surface, with two sets of sloped faces of predetermined relative angularity and areas to cause an adequate flow of the extruded metal towards the narrow end container walls, as well as towards the longer side walls, during the extruding operation whereby the metal is distributed where it is needed to produce a desired wall thickness throughout the container. Provided in each of the sloping faces at the narrow ends of the punch is an arc-shaped groove into which the metal of the slug flows at the beginning of the extrusion operation and which serves to anchor and rectilinearly guide the punch, thus preventing any tendency to sidewise movement of the working end of the punch.

Other objects and advantages of the invention will be apparent from the following detailed description taken in conjunction with the accompanying drawing, in which:

Fig. 1 is a fragmentary front elevational view of a punch and die, showing the punch embodying the features of the invention in its extreme retracted position;

Fig. 2 is a fragmentary view of Fig. 1, partly in section and on an enlarged scale, showing the punch in one of its intermediate depressed positions;

Fig. 3 is a view similar to Fig. 2 showing the punch in another depressed position, partly pressed into a slug to be extruded into a container;

Fig. 4 is a fragmentary view of the punch, partly in section, taken on the line 4—4 of Fig. 2 showing the punch in a fully depressed position after an extruding operation;

Fig. 5 is a bottom view of the punch;

Fig. 6 is a detail section taken on the line 6—6 of Fig. 4; and

Fig. 7 is a perspective view of an extruded container as produced in an operation of the apparature of this invention.

Referring to the drawing and particularly to Fig. 1, the numeral 10 indicates generally a punch designed for cooperation with a die 11. The die 11 has a relatively shallow die cavity 12 adapted to receive therein a metal slug or blank 13. When the punch 10 moves downwardly and engages the slug 13, the lower end of the punch and the side walls of the cavity 12 form a passage or orifice 14 through which the metal of the slug will be extruded upon application of pressure to the punch.

The punch 10, which may be mounted on a ram 17 of a press of any suitable type, comprises a shank 18 and a shoulder portion 19, by means of which the punch may be mounted on the ram 17. As shown in Fig. 5, the punch shank 18 is non-circular in cross-section, and the cooperating die cavity 12 is of similar configuration, for the purpose of forming a container 20 having two flat sides and two rounded ends. At its lower working end, the punch shank 18 is slightly enlarged, as indicated at 21, which is smaller in cross-section than the die cavity 12 by an amount twice the thickness of the wall of the container. The construction is such that when a metal slug 13, placed in the die cavity 12, is compressed by the punch 10, a portion of the slug is extruded or squeezed upwardly through the orifice 14 between the enlarged portion 21 of the punch and the wall of the die cavity. The extruded portion of the metal slug 13 flows upwardly along the enlarged portion 21 of the shank 18 of the punch 10, as illustrated at 22 in Figs. 4 and 6, to form the wall of the extruded container while the portion of the metal slug 13 remaining between the lower end surface of the punch and the bottom surface of the die cavity 12 forms the bottom wall of the container. This process of extruding tubular containers from metal slugs is well-known in the art. Therefore, no further description thereof is believed necessary to a complete understanding of the present invention, which pertains, primarily to the provision of means provided on the punch 10 for effecting an adequate flow of the metal of the slug during extrusion towards the two opposite narrow and rounded ends of the container as well as towards the opposite flat sides thereof to insure a uniform wall thickness throughout the container. In addition, the punch 10 is provided with means for anchoring and rectilinearly guiding the punch during the initial portion of the extruding operation so that any tendency of the lower end of the punch to move laterally or slip sidewise under the force of the extruding pressure is prevented.

To cause the above-described flow of slug metal, which is necessary, the bottom end surface of the enlarged end portion 21 of the punch 10 is shaped, as best shown in Fig. 5, to provide spaced sloping faces 24—24 at the opposite narrow rounded ends of the punch and spaced sloping faces 25—25 at the opposite flat sides thereof, the sets of faces being disposed at right angles to each other and having centered therebetween a square flat face 26, which is the extreme bottom end surface of the punch. The angles of the two sets of sloping faces 24—24 and 25—25 and their respective areas are such that the desired and necessary flow of metal is obtained with the result that the continuous non-circular wall of the container with be of uniform thickness throughout and with no voids.

In order to assist in anchoring and rectilinearly guiding the punch 10 during the initial portion of the extruding operation to prevent bending and deflection of the lower end of the punch, each of the spaced sloping faces 24—24 on the lower end surface of the punch 10 is provided with an arc-shaped groove 27 of suitable depth, the two grooves being aligned and extending longitudinally of the working end of the punch, as clearly shown in Fig. 5.

In the operation of the extruding apparatus after a slug 13 has been placed in the die cavity 12, while the punch 10 is in its fully retracted position, as shown in Fig. 1, the punch may be moved downwardly by the press ram 17 into engagement with the slug and forced downwardly to cause the metal of the slug to be extruded upwardly along the shank 18 of the punch, as shown in Figs. 4 and 6. The initial pressure of the punch 10 on the slug 13 causes the slug metal to flow into the grooves 27 to effectively anchor and rectilinearly guide the punch, thus tending to prevent lateral deflection and bending thereof when subjected to the high pressures required for the extrusion operation. As the extruding operation continues to progress after the lower end of the punch 10 is anchored from lateral deflection, the cooperating sets of sloped faces 24—24 and 25—25 serve to distribute the flowing metal where it is needed to produce a container having walls of uniform thickness throughout and without voids. The relative arrangement of the two sets of sloped faces is such that the metal being extruded is caused to flow adequately towards the opposite narrow end walls as well as towards the longer side walls of the container and in such volume that the desired uniformity in thickness of the walls thereof and without voids is effected.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for forming a container of greater length than width in cross-sectional area and which is long and of relatively small cross-sectional area by extrusion, a punch of similar relative proportions, and a die having a die cavity cooperating with said punch and of a size to provide an endless space between it and the punch when the punch is moved to operative position in said cavity, said punch having formed in its end working surface a set of aligned depressions extending parallel to its cross-sectional length into which the material flows at the beginning of the extrusion operation effective to anchor the punch whereby any tendency of deflection and bending thereof is prevented during such operation.

2. In an apparatus for forming a container of greater length than width in cross-sectional area and which is long and of relatively small cross-sectional area by extrusion, a punch of similar relative proportions, and a die having a die cavity cooperating with said punch and of a size to provide an endless space between it and the punch when the punch is moved to operative position in said cavity, and a plurality of sloped faces of predetermined relative angularity and areas formed on the working end surface of said punch effective to direct an adequate flow of material during extrusion towards the narrower end surfaces of said punch and die cavity as well as towards the longer side surfaces thereof to provide container walls of the desired thickness, said punch having formed in its narrower working end surfaces a set of aligned depressions extending parallel to its cross-sectional length into which the material flows at the beginning of the extrusion operation effective to anchor the punch whereby any tendency to deflection and bending thereof is prevented during such operation.

RALPH JONGEDYK.

REFERENCES CITED

The following references are of record in the file of this patent:

UNITED STATES PATENTS

| Number | Name | Date |
|---|---|---|
| 1,082,200 | Knaebel | Dec. 23, 1913 |
| 1,492,230 | Towne | Apr. 29, 1924 |
| 2,230,840 | Jongedyk | Feb. 4, 1941 |